United States Patent [19]

Baier et al.

[11] 3,751,287

[45] Aug. 7, 1973

[54] METHOD FOR INCORPORATING AN ADHESION PROMOTER INTO A POLYMERIC SUBSTRATE

[75] Inventors: Frederick Lawrence Baier, High Bridge; Edward Matthew Joffe, Summit, both of N.J.

[73] Assignee: Union Carbide Corporation, New York, N.Y.

[22] Filed: June 11, 1971

[21] Appl. No.: 152,369

[52] U.S. Cl.................. 117/47 A, 117/63, 117/113, 117/138.8 E
[51] Int. Cl....................... B44d 1/092, B32b 27/18
[58] Field of Search............... 117/138.8 E, 138.8 F, 117/47 A, 113, 115, 161 UZ, 161 R, 63

[56] References Cited
UNITED STATES PATENTS

| 2,112,245 | 3/1938 | Luckhaupt........................... 117/113 |
| 2,173,882 | 9/1939 | Luckhaupt........................... 117/113 |
| 2,231,891 | 2/1941 | Esselmann et al.................. 117/161 |
| 2,755,205 | 7/1956 | Robb et al.......................... 117/113 |
| 2,924,584 | 2/1910 | Wolinski............................. 117/161 |
| 3,035,944 | 5/1962 | Sher................................... 117/47 X |
| 3,556,955 | 1/1971 | Ancker............................... 117/47 X |

OTHER PUBLICATIONS

"Organic Chemistry," Degering et al., pp. 263-264, Barnes and Noble Inc., 1957.

Primary Examiner—William D. Martin
Assistant Examiner—Dennis C. Konopacki
Attorney—Paul A. Rose et al.

[57] ABSTRACT

A treating solution and method for incorporating an adhesion promoter containing at least one allylic hydrogen into a polymeric substrate, which bath is in an aqueous reactive mixture of a hydroxyl or halogen substituted low molecular weight organic compound and a dehydrating or dehydrohalogenating agent such that the reaction thereof forms the desired adhesion promoter. This solution and method are useful in plastic metal plating.

8 Claims, No Drawings

METHOD FOR INCORPORATING AN ADHESION PROMOTER INTO A POLYMERIC SUBSTRATE

This invention relates to an aqueous treating solution for incorporating an adhesion promoter into a polymeric substrate. Specifically this invention relates to an aqueous solution containing an adhesion promoter having at least one allylic hydrogen which is formed in situ by the reaction of a hydroxyl or halogen substituted precursor with a dehydrating or dehydrohalogenating agent.

This invention also relates to a method for incorporating an adhesion promoter into a polymeric substrate. Specifically this invention relates to a method whereby a polymeric substrate is immersed in an aqueous treating solution wherein the desired adhesion promoter is formed in situ as aforesaid.

It is an object of this invention to provide a low volatile aqueous treating bath for incorporation of typically volatile adhesion promoters into polymeric substrates.

It is a further object of this invention to provide an improved method for impregnating a polymeric substrate with an adhesion promoter whereby post-impregnation substrate cleaning is effectively reduced.

U.S. Pat. No. 3,556,955, patented Jan. 19, 1971 discloses a process for metal plating plastics. The adhesion promoters per se of the invention described herein are wholly within the scope of that patent. However, inherent in that process, as a step thereof, is a method of impregnating or compounding an adhesion promoter into the plastic. The adhesion promoters generally have only limited compatibility with plastics and are subject to exudation therefrom. Excessive exudate causes lessening of the desired metal-to-polymer adhesion levels.

Adhesion promoters have at least one allylic hydrogen and are typically highly unsaturated organic compounds of relatively high volatility and flammability. These characteristics make handling of the adhesion promoters in a heated bath dangerous in the absence of special safety precautions. In addition thereto, the high volatility in conjunction with the elevated bath temperatures causes undesirable adhesion promoter losses through evaporation.

This invention alleviates the aforementioned attendant problems encountered when incorporating an adhesion promoter into a plastic substrate. It was found that certain water solvated hydroxy and halogenated substituted low molecular weight organic compounds or precursors have relatively low vapor pressures when compared with the highly unsaturated adhesion promoters per se. It was further found that certain dehydrating and dehydrohalogenating agents could also be solvated in the aqueous solution and the mixture thereof would react forming in situ the desired allylic hydrogen containing adhesion promoter.

In contacting a polymeric substrate with the treating solution of the in situ formed adhesion promoter, it was determined that desired quantities of up to two per cent (2 percent) by weight of adhesion promoter to weight of substrate would penetrate at least the surface of the substrate and upon removal of the substrate from the treating solution it was further found that little or no exudate was present. Extensive surface cleaning was thus unnecessary; an aqueous medium rinse such as a water, is generally found to be sufficient.

It is theorized, although not wishing to be bound by any particular physico-chemical mechanism, that the polar nature of the treating bath of this invention in contradistinction to the non-polar nature of the adhesion promoter per se prevents excessive exudation of the adhesion promoter from the typically non-polar polymeric substrates.

The term "adhesion promoter" or "latent adhesion promoter" as used hereinbefore and throughout the specification and claims refers to a low molecular weight compound containing at least one allylic hydrogen or preferably at least two allylic hydrogens and having a minimum oxidation rate of at least twenty times or preferably fifty times that of stearic acid. The term "latent" refers to the fact that the adhesive effect is potentiated or made available only after a subsequent oxidation treatment. The term "low molecular weight" refers to compounds having molecular weights less than about 5,000. The aforesaid relative oxidation rates are determined by methods such as that described in Stirton, A.J. et al., in "Oil and Soap," 22, at pages 81–83 (1945).

Another mode of defining suitable adhesion promoter oxidative activity is in terms of auto-oxidation rates as contrasted to relative oxidation rates. An auto-oxidation rate of at least about 5 cubic centimeters of oxygen per gram of adhesion promoter per hour at 100° C. is considered to be that oxidative level necessary to achieve the desired adhesive activity. The auto-oxidation rates are calculated by the Stirton method ibid, as modified by the procedure as described in co-pending U.S. application Ser. No. 66,630 filed Aug. 24, 1970 at pages 15–16 thereof and that relevant description is incorporated herein by reference thereto.

Adhesion promoters suitable pursuant to this invention have at least one structure having the general formula:

(I)

wherein $R_1$ and $R_2$ are monovalent hydrocarbon radicals of from one to 18 carbon atoms and the free valences of $C_1$ and $C_3$ are bonded to hydrogen or a substantially inert heterohydrocarbyl or hydrocarbyl residues.

It is also within the contemplation of this invention that cyclohydrocarbyl moieties are formable by the two free valences of $C_1$ bonded in combination to sequential carbon atoms and bonded through $C_1$ to form a cyclohydrocarbyl moiety thereof as illustrated in Formula II hereinbelow.

It is also within the contemplation of this invention that cyclohydrocarbyl moieties are formable by a free valence of $C_1$ and the free valence $C_3$ bonded in combination to sequential carbon atoms and bonded through $C_1$, $C_2$ and $C_3$ to form a cyclo hydrocarbyl moiety thereof as illustrated in Formula III hereinbelow.

Graphic examples of the above are demonstrated by the following:

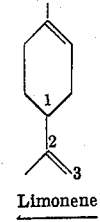

Limonene (II)

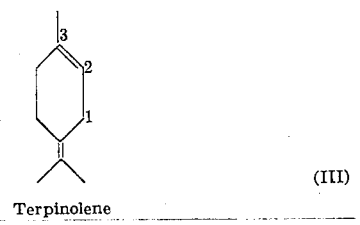

Terpinolene (III)

wherein the underscored numberals correspond to the numerals of Formula I.

Typical adhesion promoters suitable pursuant to this invention are derivatives of aliphatic and alicyclohydrocarbons containing one or more allylic hydrogens such as myrcene, ocimene, limonene, cyclohexadiene, dicyclopentadiene, terpinolene, tetraline, indene, tetrahydroindenene, ethylidene norbornene, squalene, dipentene and the like.

The adhesion promoter precursors, that is the hydroxyl or halogen substituted form of the adhesion promoter, pursuant to this invention have accordingly at least one structure of the following general formula:

wherein $X_1$ and $X_2$ are hydrogen, hydroxyl or halogen; with the proviso that only one of $X_1$ and $X_2$ is hydrogen; and $R_1$, $R_2$ and the free valences of $C_1$ and $C_3$ are bonded as defined hereinbefore in Formula I.

Examples of such precursors are primary, secondary and tertiary organic alcohol forms of the adhesion promoters, and in fact any alcohol form of the adhesion promoter having the structure of Formula IV is suitable pursuant to this invention.

Specifically found to be suitable precursors are the terpene alcohols, for example, terpin hydrate (a diol), $\alpha$-terpineol, $\beta$-terpineol and $\gamma$-terpineol.

Halogenated adhesion promoter precursors are likewise not limited to any particular class of compounds. Suitable halogenated adhesion promoters are for example any halogen substituted adhesion promoter conforming to Formula II hereinabove where upon dehalogenation yields the desired allylic hydrogen containing adhesion promoter.

Suitable dehydrating agents pursuant to this invention are selected from groups consisting of inorganic acids, inorganic acid salts and strong organic acids. Examples of such inorganic acids are sulfuric acid, hydrochloric acid, hydrofluoric acid, phosphoric acid and the like; inorganic acid salts such as potassium metaphosphate, sodium bi-sulfite and the like; organic acids such as oxalic acid, formic acid, acetic acid and the like.

Suitable dehydrohalogenating agents pursuant to this invention are selected from the group consisting of inorganic bases and strong basic alcohols. Examples of such inorganic bases are sodium hydroxide, potassium hydroxide, calcium hydroxide and the like; strong basic alcohols such as methanol, ethyl alcohol, isopropyl alcohol and the like.

Polymeric substrates suitable pursuant to this invention are thermoplastics such as the polyolefins (for example polyethylene, polypropylene, poly(butene-1), and the like), polyvinyl chloride, polyvinyl acetate, polystyrene, polyacrylonitrile, polystyrene, polyacrylonitrile, polyformal, polyacylic acid esters, polymethacrylic acid esters, copolymers thereof and the like. Preferred polymers are the polyolefins, particularly polyethylene and polypropylene. and water are not narrowly critical. Dehydrating agent concentrations of In preparing the treating solution pursuant to the practice of this invention the relative proportions of adhesion promoter precursor, dehydrating/dehydrohalogenating agent concentrations of about 50 per cent by weight are generally employed. Stoichiometric quantities of adhesion promoter precursor and dehydrating or dehydrohalogenating agent are usually employed. Greater than stoichiometric quantities of dehydrating/dehydrohalogenating agent may be employed if desired.

The use temperature of the treating solution is usually elevated to temperatures in excess of about 60° C. to about 100° C. Lower temperatures may be used if desired, but generally not below 50° C. Elevated temperatures are preferred and it is found that with higher temperatures the rate of impregnation increases.

In the practice of this invention the treating solution may be brought into contact with the polymer using known techniques of immersion, spraying, rubbing, compounding and the like methods. Immersion of the polyer into the treating bath is more conventional and gives satisfactory results.

Continuous vigorous agitation of the treating solution by means of mechanical or gas spraying, is found to enhance impregnation of the adhesion promoter when polymers are immersed in the treating solution and thereby reduce the immersion time. Immersions periods of from 1 to about 20 minutes is found to be suitable with a bath temperature of about 65° C. under continuous agitation.

After impregnation of up to about 2 percent by weight of adhesion promoter is completed, generally less adhesion promoter is required, the treated substrate is then oxidized by any known technique. Afterwards a conductive metal coating can be deposited on the oxidized polymer thereby permitting subsequent conventional electroplating techniques to be employed so as to obtain an electroplated polymeric substrate exhibiting a minimum peel strength of at least about 5.0 pounds per inch width.

The following examples are merely illustrative of the practice of this invention and are not to be construed as limiting the scope or intent thereof.

EXAMPLES 1-2

A polymeric substrate, polypropylene, and dehydrating agents, sulfuric and phosphoric acid, were also employed in these examples.

Three impregnation baths were made as follows: The first contained 30 grams of terpin hydrate and 900 ml. water; the second 30 grams of terpin hydrate, 300 ml. concentrated sulfuric acid and 600 ml. water; the third contained 30 grams of terpin hydrate, 300 ml. concentrated phosphoric acid and 600 ml. water. Each bath was heated to 65° C. and maintained at that temperature under continuous agitation.

Three polypropylene plaques were impregnated in these baths at 65° C. for 5 minutes and then treated as follows:

The samples were then rinsed briefly in water and immersed in a chromic acid bath, comprised 30 parts of chromium trioxide, 30 parts of sulfuric acid and 40 parts of water (all parts by weight). The bath was maintained at 80° C. and the immersion time of the plaques was 5 minutes. The plaques were then rinsed first in a mildly alkaline aqueous solution, next in deionized water and then sensitized by immersion for 5 minutes at room temperature in hydrochloric stannous chloride sensitizer solution. After a brief water rinse at room temperature, the plaques were activated by immersion for 5 minutes in a dilute palladium chloride solution having a pH of 2.8, again rinsed briefly in water at room temperature and then electroless nickel plated using a conventional hot electroless nickel bath. The electroless nickel bath was operated at 80° C. and electroless nickel deposition was continued until a sufficient layer of metal was deposited to permit subsequent metal deposition by conventional electroplating. The plaques were then electroplated until a total nickel coating of 2 mils was obtained.

The adhesive peel strength between the metal and the plastic was subsequently determined by scoring a 1-inch wide strip in each plaque, lifting the end of the metallic strip, clamping a weight pan to the end of the strip and adding weights to apply a tensile load at a right angle to that of the metal-plastic interface until the metal strip peeled away from the plastic substrate.

The resulting peel strength data are shown in Table I below:

TABLE I

| Example | Dehydrating Agent | Peel Strength lbs./in. |
|---|---|---|
| Control A | None | 0.5 |
| 1 | Sulfuric acid | 34 |
| 2 | Phosphoric acid | 36 |

EXAMPLES 3–5

These examples illustrate the use of α- and β-terpineol as well as a mixture of natural terpene alcohols ("pineoils") as latent adhesion promoter precursors. The polymeric substrate was polypropylene and the dehydrating agent was hydrochloric acid.

Three impregnation baths were made as follows. To 15 ml. of the terpene alcohol was added 400 ml. of concentrated hydrochloric acid and 600 ml. water. Three control baths were made in the same way except that water was substituted for the hydrochloric acid. All baths were then heated to 80° C. and maintained at that temperature under constant agitation.

The polypropylene plaques were impregnated in these baths at 80° C. for 5 minutes and then treated as in Examples 1–2. The resulting peel strengths are shown in Table II below:

TABLE II

| Example | Adhesion Promoter Precursor | Dehydrating Agent | Peel Strength lbs./in. |
|---|---|---|---|
| Control B | α-Terpineol | None | 0.5 |
| 3 | α-Terpineol | HCl | 38 |
| Control C | β-Terpineol | None | 0.6 |
| 4 | β-Terpineol | HCl | 44 |
| Control D | Pine Oil | None | 0.6 |
| 5 | Pine Oil | HCl | 41 |

What is claimed is:

1. A method for impregnating a polymeric substrate with an adhesion promoter which comprises:
    a. contacting a polymeric substrate with an aqueous treating solution comprising:
        i. a water soluble adhesion promoter precursor having at least one structure as follows:

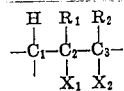

wherein $R_1$ is a hydrogen or monovalent hydrocarbon of from one to 18 carbon atoms; $R_2$ is a hydrogen or monovalent hydrocarbon of from one to 18 carbon atoms; $X_1$ is hydrogen, or hydroxyl; X hydrogen, or hydroxyl; with the proviso that only one of $X_1$ and $X_2$ is hydrogen; and the free valences of $C_1$ and $C_3$ are bonded to hydrogen, substantially inert heterohydrocarbyl or hydrocarbyl residues;
        ii. a dehydrating agent selected from the group consisting of an inorganic acid, inorganic acid salt and a strong acid; and
    b. removing said treated polymeric substrate from said aqueous treating solution; thereby recovering an adhesion promoter impregnated polymeric substrate.

2. The method of claim 1 wherein the contacting is by immersion in a bath.

3. The method of claim 2 wherein the immersion period is from about 1 to 20 minutes.

4. The method of claim 2 wherein the bath temperature is at a temperature of from about 60° to 100° C.

5. The method of claim 2 wherein the treated bath is agitated.

6. The method of claim 2 wherein the polymeric substrate is a polyolefin.

7. The method of claim 6 wherein the polyolefin is polypropylene.

8. The method of claim 1 which further comprises rinsing the impregnated polymeric substrate in an aqueous medium.

* * * * *

UNITED STATES PATENT OFFICE
CERTIFICATE OF CORRECTION

Patent No. 3,751,287    Dated August 7, 1973

Inventor(s) Frederick Lawrence Baier et al.

It is certified that error appears in the above-identified patent and that said Letters Patent are hereby corrected as shown below:

Column 4, lines 5 and 6, after "polypropylene" delete "and water are not narrowly critical. Dehydrating agent concentrations of"; line 10, after "agent" add -- and water are not narrowly critical. Dehydrating agent --.

Signed and sealed this 4th day of March 1975.

(SEAL)
Attest:

RUTH C. MASON
Attesting Officer

C. MARSHALL DANN
Commissioner of Patents
and Trademarks